(12) United States Patent
Yeh

(10) Patent No.: US 6,264,156 B1
(45) Date of Patent: Jul. 24, 2001

(54) MULTI-FUNCTION COMPUTER WORK AIDING BOARD

(76) Inventor: Sheng-Fu Yeh, 3 F., No. 61-2, Chung Hsing St., Shu-Lin, Taipei Hsien (TW)

(*) Notice: Subject to any disclaimer, the term of this patent is extended or adjusted under 35 U.S.C. 154(b) by 0 days.

(21) Appl. No.: 09/459,619

(22) Filed: Dec. 13, 1999

(51) Int. Cl.$^7$ .................................................. A47B 91/00
(52) U.S. Cl. ................................ 248/346.01; 248/442.2
(58) Field of Search .............................. 248/346.01, 918, 248/442.2; 312/283

(56) References Cited

U.S. PATENT DOCUMENTS

| | | | |
|---|---|---|---|
| 5,443,237 | * | 8/1995 | Stadtmauer ....................... 248/918 X |
| 5,692,815 | * | 12/1997 | Murphy ................................ 312/283 |

* cited by examiner

Primary Examiner—Ramon O. Ramirez

(74) Attorney, Agent, or Firm—A & J

(57) ABSTRACT

A multi-purpose computer work aiding board includes a board body, a rotary disk having a top face forming a mouse pad, and a substantially inverted U-shaped copy holding frame. A top face of the board body being provided with a plurality of recessed grooves of different sizes that are adapted to accommodate disks of different sizes in an upright position or to receive a mouse and stationery items. Four sides of a bottom face of the board body form struts such that, when the board body is placed in a position, a lower end of the board body forms a through space for receiving the rotary disk, a disk rim portion of the rotary disk forming a pivot mounting hole. The bottom of the board body is provided with at least one strut forming a pivot for insertion into the pivot mounting hole such that the rotary disk can be rotatably turned sideways into or out of the through space, a periphery of the top face of the board body forming a recess for receiving the copy holding frame. The recess is pivotally connected to two side root portions of the copy holding frame in corresponding positions such that the copy holding frame may be lifted from the recess for holding a copy in an upright position.

4 Claims, 4 Drawing Sheets

MULTI-FUNCTION COMPUTER WORK AIDING BOARD

BACKGROUND OF THE INVENTION (a) Field of the Invention

The present invention relates to a multi-function computer work aiding board.

(b) Description of the Prior Art

With the popularity of computers, people's manners of "working" have also changed drastically. Work such as writing, drawing, data searching, is computerized to increase efficiency.

Computer peripherals, such as mouse, disks of different sizes, have almost become standard accessories. Users have to consider arrangement of such computer peripherals in addition to placement of the computer mainframe. In general, disks are stored in disk storage cases; mouse is placed on a mouse pad; copies are held by copy holders, etc. As such, the user need to arrange a number of items around the computer when using the computer, which is space occupying and disorderly.

SUMMARY OF THE INVENTION

A primary object of the present invention is to provide a multi-function computer work aiding board that is adapted to receive disks of different sizes, that is pivotally connected to a copy holder and a rotary disk with a mouse pad for placement of a mouse, so that various computer peripherals can be arranged neatly on a single board body.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
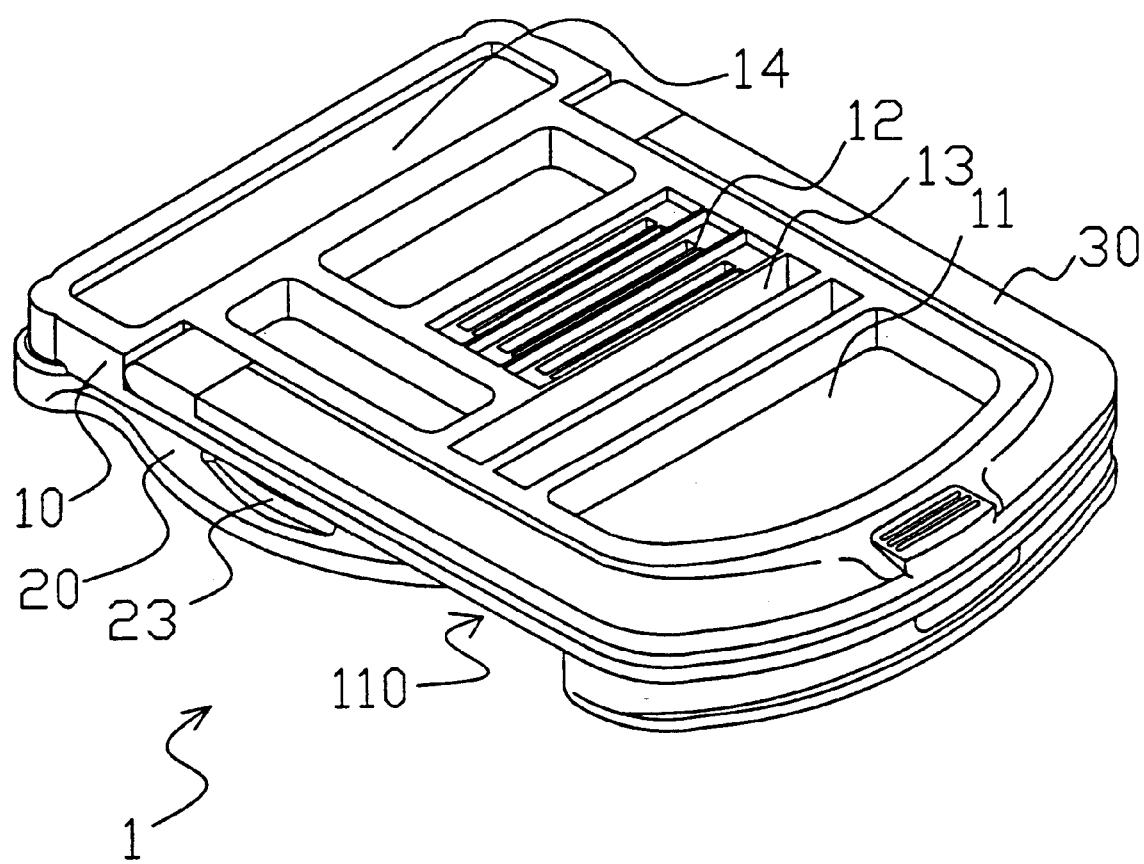
FIG. 1 is a perspective view of a multi-function computer work aiding board of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
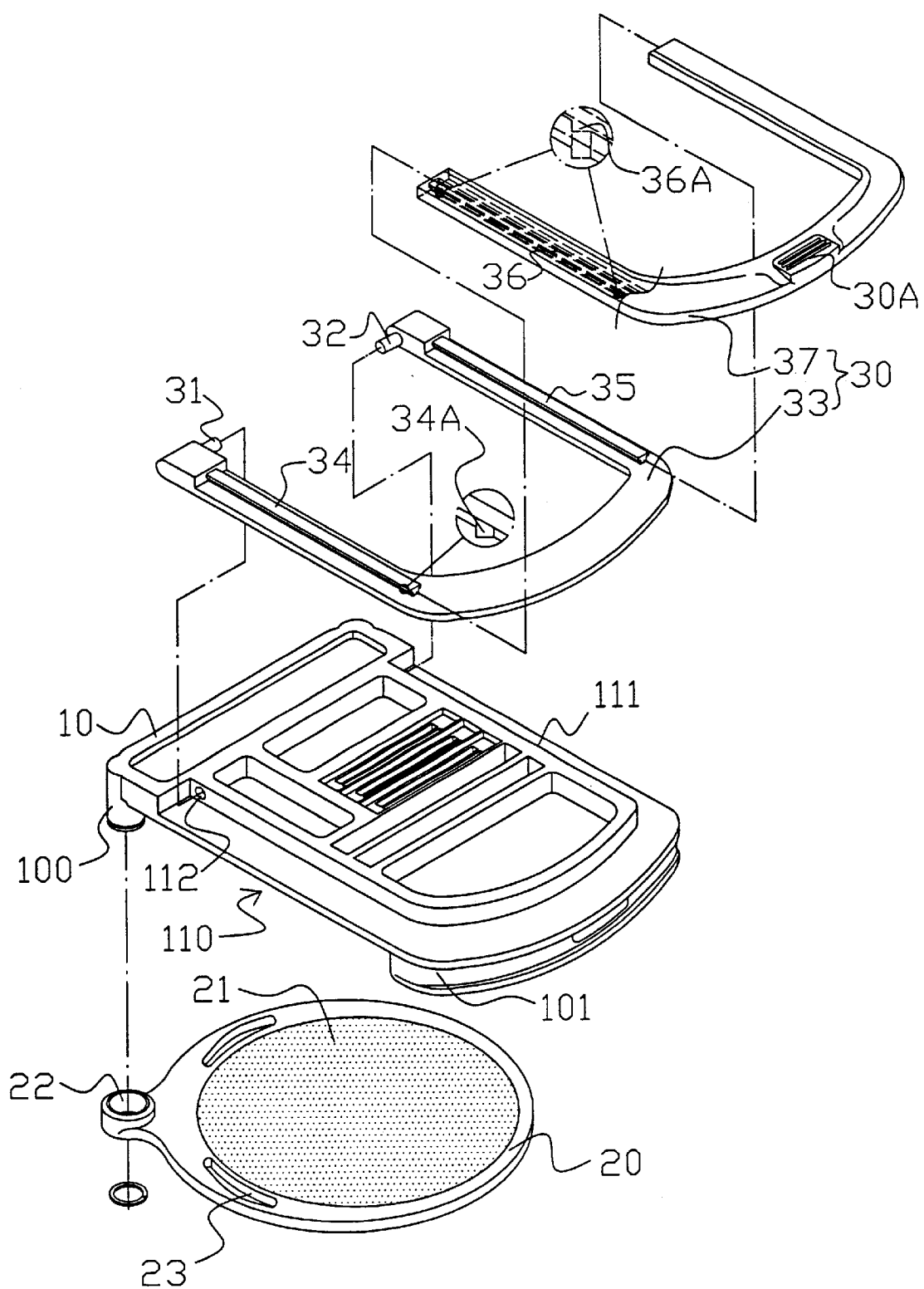
FIG. 2 is an exploded perspective view of the present invention.

With reference to FIGS. 1 and 2, a multi-function computer work aiding board of the present invention is shown to comprise a board body 10, a rotary disk 20 having a top face forming a mouse pad 21, and a substantially inverted U-shaped copy holding frame 30. A top face of the board body 10 is provided with a plurality of recessed grooves 11, 12, 13, 14 . . . of different sizes. The groove 11 is sized to receive a mouse. The grooves 12, 13 are adapted to hold disks of corresponding sizes in an erect position. As for the rest of the grooves 14, . . . , they can be adapted to receive stationery items such as paper and pens. The four sides of a bottom face of the board body 10 form struts 100, 101, . . . such that when the board body 10 is placed on a work plane, such as a desk surface, a lower end of the board body 10 forms a through space 110 for receiving the rotary disk 20. A disk rim portion of the rotary disk 20 forms a pivot mounting hole 22. The bottom of the board body 10 is provided with at least one strut 100 that serves as a pivot for insertion into the pivot mounting hole 22 such that the rotary disk 20 can be rotatably turned sideways into or out of the through space 110. The opposite end of the board body 10 may also form a pivot so that the user can choose to use which pivot to insert into the pivot mounting hole 22 to adapt to his/her left-handed or right-handed habit. In addition, a pull groove 23 is provided near the center of rotation of the rotary disk 20 in the disk rim that is exposed from the board body 10. The periphery of the top face of the board body 10 forms a recess 111 for receiving the copy holding frame 30. The recess 111 is provided with connecting holes 112, . . . in two side walls corresponding to two side root portions of the copy holding frame 30. Pivotal posts 31, 32 are provided on the two side root portions of the copy holding frame 30 to correspond to the connecting holes 112, . . . so that the copy holding frame 30 can be pivotally connected with the recess 111.

The copy holding frame 30 includes a frame skeleton 33 and an extension frame 37 disposed atop the frame skeleton 33. The frame skeleton 33, besides having two inner side root portions forming the above-mentioned pivotal posts 31, 32, has guide tracks 34, 35 respectively provided on a top side of the two side portions thereof. Elastic projecting retainers 34A, . . . project from lateral sides of the guide tracks 34, . . . in suitable positions. Where the two lateral side portions of the extension frame 37 fit into the guide tracks 34, 35, spaced-apart concavities 36, . . . are formed. A plurality of recessed retaining holes 36A, . . . are provided among the spaced-apart concavities in suitable positions. When the guide tracks 34, . . . extend into the concavities 36, the frame skeleton 33 can couple with the extension frame 37. Besides, when the extension frame 37 slidably displaces along the frame skeleton 33, the elastic projecting retainers 34A, . . . will be elastically retained in the recessed retaining holes 36A, . . . to achieve an extension retaining function in several positions. An elastic clamping retainer 30A is further provided in the center of a top face of the extension frame 34 where it may be closed.

Figure 3:
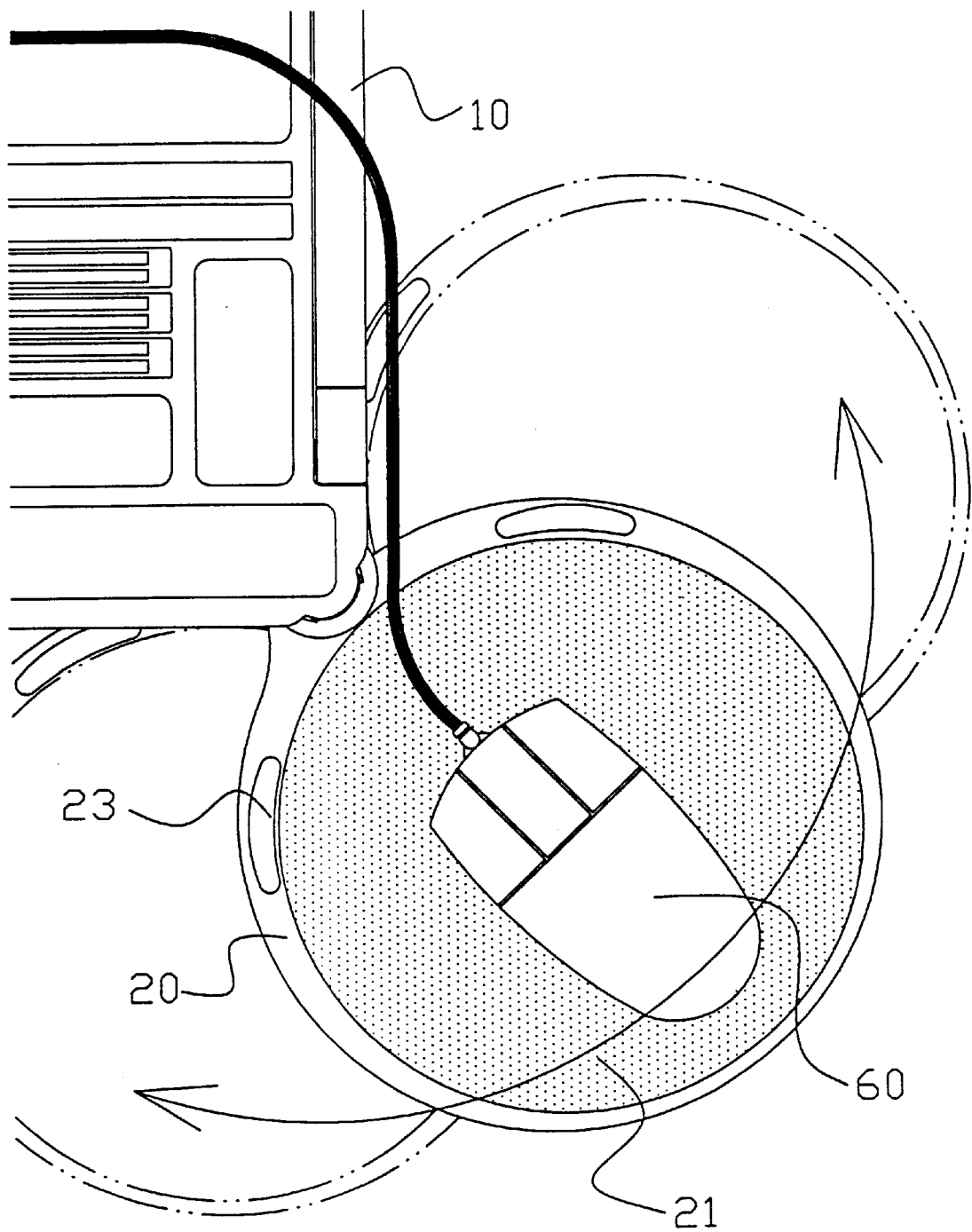
FIG. 3 is a schematic view illustrating the operation of the present invention.
Figure 4:
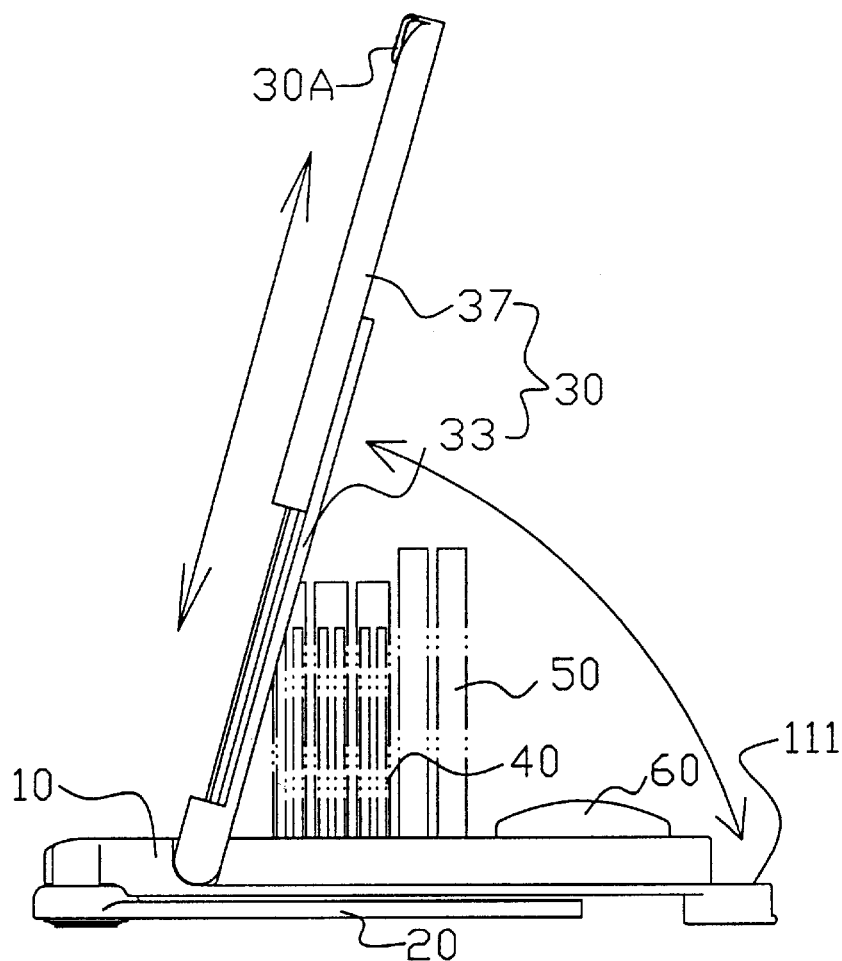
FIG. 4 is a schematic view illustrating operation of a copy holding frame of the present invention.
Figure 5:
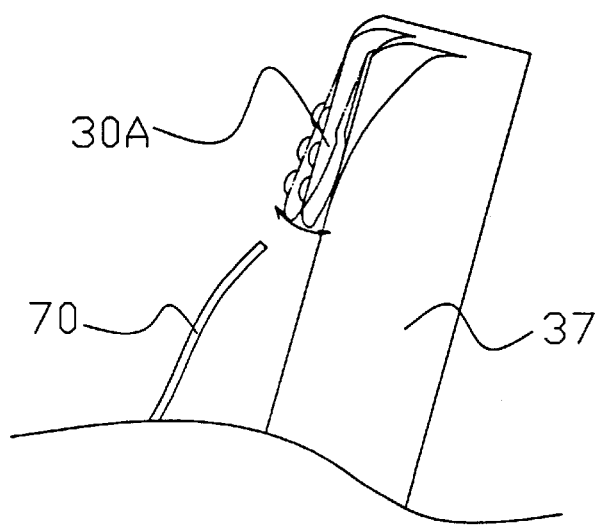
FIG. 5 is a schematic view illustrating the clamping of a document by the copy holding frame of the present invention.

When it is desirable to use the mouse in computer operations, with reference to FIG. 3, it is only necessary to hold the pull groove 23 and rotate the rotary disk 20 from under the board body 10 so that the mouse pad 21 on the to face of the rotary disk 20 is exposed to allow a mouse 60 to displace thereon. The mouse mode operation can be closed by pushing the rotary disk 20 back below the board body 10. When it is needed to key in the data on a document, with reference to FIG. 4, the copy holding frame 30 is lifted from the recess 111, and the extension frame 37 is pulled along the frame skeleton 33 until it is properly retained and secured. When the copy holding frame 30 is pulled up, it will pass over the different-size disks 40, the optical disks 50 and the mouse 60 on the board body 10 without causing obstruction. Referring to FIG. 5, the elastic clamping retainer 34A may be pulled to clamp a document 70. It can therefore be appreciated from the above that the present invention provide the user with multiple functions.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A multi-purpose computer work aiding board, comprising a board body, a rotary disk having a top face forming a mouse pad, and a substantially inverted U-shaped copy holding frame, a top face of the board body being provided with a plurality of recessed grooves of different sizes that are adapted to accommodate disks of different sizes in an upright position or to receive a mouse and stationery items, four sides of a bottom face of the board body forming struts such that, when the board body is placed in a position, a lower end of the board body forms a through space for receiving the rotary disk, a disk rim portion of the rotary disk forming a pivot mounting hole, the bottom of the board body being provided with at least one strut forming a pivot for insertion into the pivot mounting hole such that the rotary disk can be rotatably turned sideways into or out of the through space, a periphery of the top face of the board body forming a recess for receiving the copy holding frame, the recess being pivotally connected to two side root portions of the copy holding frame in corresponding positions such that the copy holding frame may be lifted from the recess for holding a copy in an upright position.

2. A multi-function computer work aiding board as defined in claim 1, wherein the disk rim of the rotary disk disposed below and projecting from the board body near a center of rotation of the rotary disk is provided with a pull groove.

3. A multi-function computer work aiding board as defined in claim 1, wherein the recess is provided with connecting holes in two side walls corresponding to the two side root portions of the copy holding frame, the two side root portions of the copy holding frame being provided with pivotal posts corresponding to the connecting holes to fit tightly into the connecting holes so that the copy holding frame can be pivotally connected with the recess.

4. A multi-function computer work aiding board as defined in claim 2, wherein the copy holding frame includes a frame skeleton and an extension frame disposed on top of the frame skeleton, the frame skeleton having two inner side root portions forming the pivotal posts and guide tracks respectively provided on a top side of the two side portions thereof, elastic projecting retainers project from lateral sides of the guide tracks in suitable positions, spaced-apart concavities being formed in where two lateral side portions of the extension frame fitting into the guide tracks, a plurality of recessed retaining holes being provided among the spaced-apart concavities in suitable positions such that, when the guide tracks extend into the concavities, the frame skeleton can couple with the extension frame, the elastic projecting retainers being elastically retained in the recessed retaining holes when the extension frame slidably displaces along the frame skeleton, thereby achieving an extension retaining function in several positions, an elastic clamping retainer being further provided in the center of a top face of the extension frame where it may be closed.

* * * * *